Feb. 10, 1959  R. W. KENNEY  2,872,935
VALVE MECHANISM
Filed Feb. 28, 1955  3 Sheets-Sheet 1
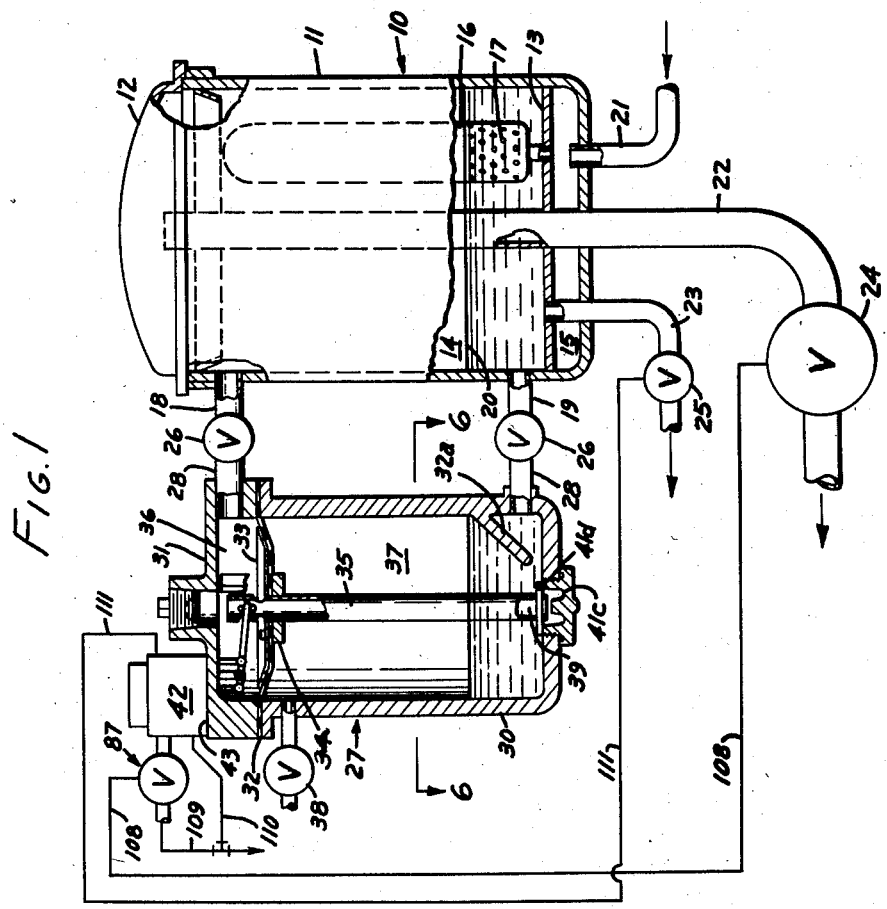
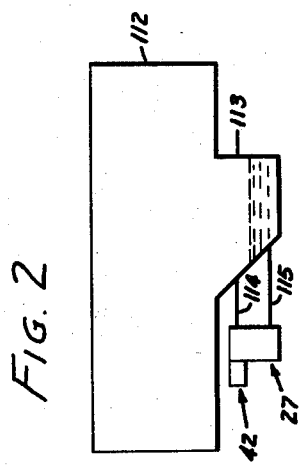
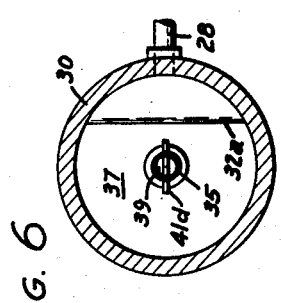
INVENTOR.
ROBERT W. KENNEY
BY
D. Gordon Angus
ATTORNEY.

Feb. 10, 1959  R. W. KENNEY  2,872,935
VALVE MECHANISM

Filed Feb. 28, 1955  3 Sheets-Sheet 2

INVENTOR.
ROBERT W. KENNEY
BY
D. Gordon Angus
ATTORNEY.

Feb. 10, 1959 R. W. KENNEY 2,872,935
VALVE MECHANISM

Filed Feb. 28, 1955 3 Sheets-Sheet 3

INVENTOR.
ROBERT W. KENNEY
BY
D. Gordon Angus
ATTORNEY.

United States Patent Office 2,872,935
Patented Feb. 10, 1959

2,872,935
VALVE MECHANISM

Robert W. Kenney, South Pasadena, Calif.

Application February 28, 1955, Serial No. 491,031

15 Claims. (Cl. 137—172)

This invention relates to liquid separator arrangements and more particularly to arrangements for separating a heavier liquid from a lighter liquid.

An object of the invention is to provide a reliable means for separating the liquids of a non-miscible liquid mixture. A related object is to provide a control device for controlling the liquid separation which will not be rendered inoperative by a surge load of the denser liquid. A further related object is to provide means for permitting the steady flow of one or both of the liquid components of the liquid mixture during normal operation, but for interrupting the flow of one of the components should the system become overloaded with the other component.

Liquid separator tanks are well known. In a conventional separator tank, two non-miscible liquids of different specific gravities can be separated out from each other. A common application of such a separator tank is to separate out and drain off water from gasoline. Such separator tanks are ordinarily provided with a supply inlet through which the liquid is introduced to the tank, and also with a pair of outlets. The outlets are commonly disposed at different levels so that the lighter liquid can be drawn off at the upper outlet and the heavier liquid at the lower outlet. Control means are well known for separating the two liquids in the separator tank. One known type utilizes a diaphragm in the control means, the position of the diaphragm being determined by the level of the heavier liquid in the separator tank; and such a control has been used for separating water from gasoline. A disadvantage experienced in the use of such a control means has heretofore resided in the fact that an over-surge of water at the diaphragm can render the diaphragm control inoperative.

This invention is carried out in connection with such a separator tank, flow through which is determined by the condition of a diaphragm control. In accordance with the present invention, an arrangement is provided in association with the diaphragm control so that its control function cannot be rendered inoperative even in the presence of an excessive surge of the heavier liquid, such as water in gasoline.

A feature of the invention resides in a diaphragm control having a casing with a cavity therein and a flexible or movable diaphragm extending generally horizontally across the cavity, the cavity thereby being divided into an upper chamber and a lower chamber. The separator tank is tapped at upper and lower regions by conduits connecting respectively with the upper and lower chambers of the cavity on opposite sides of the diaphragm so as to exert fluid pressure on both sides of the diaphragm. The diaphragm has a central port and is disposed around a substantially vertical standpipe. This standpipe makes a fluid interconnection between the upper and lower chambers of the cavity and also creates a region of substantial depth beneath the diaphragm and outside the standpipe in which buoyant lighter liquid can be trapped to act as a float. The lighter component of any binary mixture can thereby be trapped in quantity underneath the diaphragm and around the standpipe so as to serve as a float supported by the heavier component, regardless of the relative specific gravities of the two liquids, so long as these specific gravities are unequal. Then the diaphragm may be utilized as a control for valves or other components by being connected thereto through actuating means.

An optional feature of the invention resides in a compound valving arrangement responsive to the position of the diaphragm control for controlling flow through a drainage outlet and a supply outlet of the separator tank, which is capable of allowing flow solely through either the supply outlet or the drain outlet or through both simultaneously.

A further optional feature of the invention resides in an accelerator valve capable of regulating control valve actuation so that the valve may be operated at a rapid rate or a slower rate as desired.

The above and other features of this invention will be fully understood from the following detailed description and the accompanying drawings, of which:

Fig. 1 is an elevation, partly in cut-away cross-section of a separator control system according to the invention;

Fig. 2 is an elevation of an alternate arrangement of the elements of Fig. 1;

Fig. 6 is a cross-section taken at line 6—6 of Fig. 1; and

Figure 3:
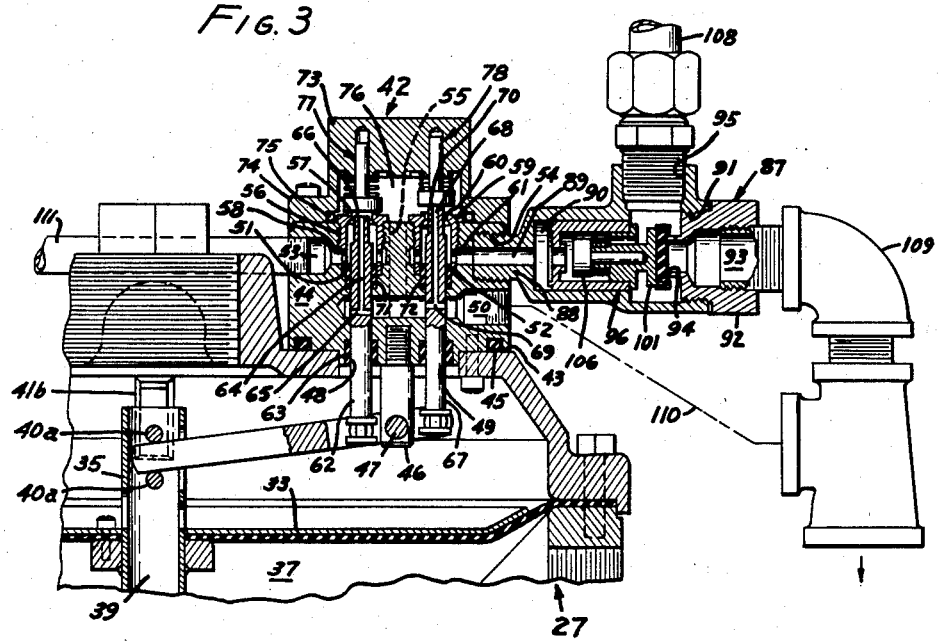
Figs. 3–5 are fragmentary elevation views, partly in cross-section, showing several operational conditions of the system shown in Fig. 1.

In Fig. 1 there is shown a separator tank 10 comprising a bottom pot 11 with a pivoted lid 12. An imperforate baffle 13 extends across the inside of the separator tank to divide the inside into a settling chamber 14 above the baffle and an inlet chamber 15 below the baffle.

A diffuser 16 interconnects the inlet chamber and the settling chamber, and has perforations 17 which permit fluid to pass into the settling chamber without excessive turbulence. An upper conduit 18 and a lower conduit 19 side-tap the separator tank at upper and lower regions of the settling chamber 14, and the interface 20 between the heavier and lighter liquids will customarily stand below the upper conduit 18.

An inlet line 21 discharges into the inlet chamber 15, and an outlet line 22 discharges from the upper region of the settling chamber. A lower drain line 23 discharges from the bottom of the settling chamber.

A discharge valve 24 is placed in the outlet line and a drain valve 25 is placed in the drain line. These valves are preferably of the type which are closed when atmospheric pressure is exerted on the valve case, and which are open when a higher fluid pressure is exerted on the case. Discharge valve 24 and drain valve 25 are sometimes referred to herein as flow valves. Shut-off valves 26 are disposed in conduit 18 and 19 so that the control system can be disconnected if desired.

A diaphragm control 27 is connected by pipes 28 with the valves 26 and conduits 18 and 19. This diaphragm control has a case made of a bottom section 30 and a top section 31. A flexible diaphragm 32 is clamped at its edges between the top and bottom sections. A baffle 32a extends across one side of the bottom of the bottom section, above the lower pipe 28.

An upper cup shaped backing plate 33 and a lower annular attachment ring 34 are placed on opposite sides of the diaphragm and clamped together. A stand pipe 35 passes through the backing plates and diaphragm, and depends below the diaphragm. The attachment ring 34 may conveniently be brazed to the stand pipe.

The diaphragm divides the cavity of the control case into an upper chamber 36 and a lower chamber 37.

A vent valve 38 is provided just under the diaphragm at the upper margin of the lower chamber 37. The two chambers are fluidly interconnected through a conduit 39 in the stand pipe. The diaphragm control will be placed so that the normal operating level of the interface 20 is above the bottom of section 30, and below the diaphragm.

The wall of the standpipe above the diaphragm has fluid ports 40 therethrough, and also a pair of pins 40a on its inside. A lever arm 41 passes through one of these ports and stands between the pins so that the lever arm is raised and lowered with the standpipe and diaphragm. A stop 41b depends from the top section 31 of the diaphragm control case, adapted and arranged to limit the upward movement of the standpipe.

A well 41c gives clearance to the lower end of the standpipe. A pin 41d limits the lower position of the standpipe.

A control valve 42 is mounted to a base 43 on the top of the diaphragm control case (see Fig. 3). Said control valve 42, its linkage linked to the diaphragm, and its connections to the flow valves herein may be referred to as "actuator means." A base section 44 of the control valve seats flush on the diaphram control, and an O ring 45 seals the abutment. A pivot post 46 projects down from the base section and into the upper chamber of the diaphragm control. A pin 47 in this post serves to pivot the lever arm 41 at a point spaced from the end of the arm.

Two valve shaft passages 48, 49 are drilled upwardly through the base section, one on each side of the pivot post 46. A bore 50 is drilled horizontally so as to intersect both shaft passages. Counterbores 51, 52 enlarge the upper ends of shaft passages 48, 49 respectively.

Internally threaded bore 53 intersects counterbore 51, and internally threaded bore 54 intersects counterbore 52. A bore 55 interconnects the upper chamber of the diaphragm control with the upper surface of the base section.

Valve seat insert 56 is fitted into counterbore 51 with an annular seat 57 at its upper margin. Ports 58 are formed in the side of the insert to give fluid connection between bore 53 and the inside of the valve seat insert. Similarly, a valve seat insert 59 with an annular seat 60 at its upper margin is fitted into the counterbore 52. Ports 61 interconnect the inside of the valve seat insert with bore 54.

A valve stem 62 passes upward through valve shaft passage 48 and counterbore 51. It is slidably mounted to arm 41 so as to be moved up and down, but not sidewise, by the arm. Packing 63 seals between the stem and the base section 44. The upper end of the stem has an axial passage 64 partway through the length of the stem, and a transverse passage 65 interconnecting the axial passage 64 with the bore 50. The upper end of the valve stem is an annular valve seat 66.

Another similar valve stem 67 passes upward through valve shaft passage 49 and counterbore 52. The stem 67 is slidably mounted to arm 41 on the opposite side of pin 47 from the valve stem 62, so as to be moved in the opposite direction from the valve stem 62 when the arm is pivoted. This valve stem is also adapted for purely vertical reciprocation in its valve shaft passage. An axial passage 68 is bored partway through the stem from the top, and a transverse passage 69 interconnects the axial passage with the bore 50. The upper end of the valve stem terminates in an annular valve seat 70.

Packings 71 and 72 are provided to seal between the valve stems 62 and 67, respectively, and the base section above the bore 50.

A cap section 73 has a flange 74 adapted to seal with the upper surface of the base section. An O ring 75 seals this joint. A chamber 76 is formed, between the base and cap sections by means of a sink in the cap section, and bore 55 opens into this chamber.

Figure 4:
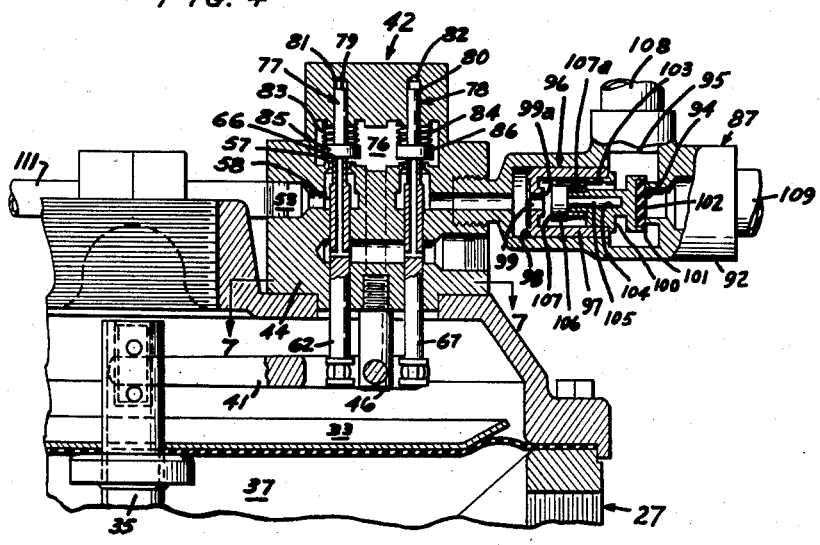

Poppet valves 77 and 78 are respectively disposed above valve stems 62 and 67 (see Fig. 4). These poppet valves have posts 79, 80 reciprocable in sockets 81, 82 respectively. Compressible coil springs 83, 84 tend to press the poppet valves toward valve seats 66 and 70. Valve facings 85, 86 are disposed one on the end of each poppet valve.

An accelerator valve 87 with an externally threaded neck 88 is threaded into bore 54 and has a passage 89 leading from bore 54 into a cylinder 90. At the end of the cylinder away from the neck, a set of threads 91 is provided to receive a plug 92. This plug is in line with the neck 88, and has a central bore 93 terminating in an annular valve seat 94. A second opening 95 is provided through the side of the cylinder.

A compound piston 96 is slidably fitted in the cylinder 90. This compound piston (see Fig. 4) has a cup-shaped body 97 with a sealing ring 98 on its face adjacent the neck 88, a port 99 inside the sealing ring, and an annular seal 99a inside the cup. A guide member 100 is fitted to the righthand end of the cup-shaped body 97 as seen in Fig. 4, which has a cap 101 with a face 102 adapted to be seated on annular valve seat 94. There is also a passage 103 interconnecting the inside of the cup-shaped body 97 with the cylinder to the right of the compound piston as shown in Fig. 4. A socket 104 in the guide member 100 is axially aligned with the neck, and faces the inside of the cup-shaped body to accommodate the post 105 of a poppet valve 106. This poppet valve has a facing 107 adapted to be seated on seat 99a. A compressible coil spring 107a urges the poppet valve 106 toward the seat 99a.

The opening 95 is connected by conduit 108 to discharge valve 24. Bore 93 in plug 92 exhausts to atmosphere through conduit 109. Bore 50 in the base section also exhausts to atmosphere, through conduit 110. Bore 53 is connected to drain valve 25 by conduit 111.

In Fig. 2 there is shown an alternate arrangement of the elements of Fig. 1. The separator tank 112 is generally horizontal instead of vertical, and the denser liquid collects in a sump 113 at the bottom of the separator tank. Conduits 114 and 115 side-tap the sump and interconnect with the upper and lower chambers 36 and 37 of the diaphragm control 27. The control valve and other connections are the same as in the system of Fig. 1.

The operation of this control system of Fig. 1 will now be described. It will be assumed that the separator tank is to be utilized for the separation by settling of two component liquids of a binary mixture. These liquids will be substantially non-miscible when rapid separation is desired, and will definitely have different specific gravities. The tendency of these components when in non-turbulent flow will be for the denser liquid to settle to the bottom of the tank, and for the lighter liquid to rise to the top of the tank, there being an interface 20 at the junction of the two separarted liquids.

Drain valve 25 is provided to drain off the denser liquid as it collects, and the discharge valve 24 is provided to control flow of the lighter liquid. When the denser liquid is the minor component, the discharge valve 24 is the primary control for flow through the inlet line 21. When the denser liquid is the major component, then the drain valve 25 will be the primary control. When the percentages of the components are both significant, then both valves will exert a significant influence on the total flow through the inlet line.

For purposes of illustration, consider the case of separation of a small and varying percentage of water from gasoline. An almost limitless list of other examples could be enumerated. However, this is a practical separation problem to which the control system of the invention is particularly suited.

The binary gasoline-water mixture flows through the inlet line 21 and into the inlet chamber 15. It rises through the diffuser 16, and flows quietly into the settling chamber 14. The water present settles onto the baffle 13 and fills the conduit 23 leading to and controlled by the drain valve. The less dense gasoline rises above the water in the settling chamber and flows into discharge line 22 which is controlled by discharge valve 24. The interface 20 marks the lower surface of the gasoline and the upper surface of the water.

The object of this tank is to drain the water through the drain valve without also draining off gasoline, and to withdraw water-free gasoline through the discharge valve. The diaphragm control 27 and the control valve 42 are provided to control the drain valve and the discharge valve so that withdrawal of the separated components is attained.

When the binary mixture is first introduced into the separator tank, there will be an initially small volume of water or other dense fluid which begins to collect in the settling chamber, and the interface can be expected to stand below the bottom of the stand pipe 35. The vent valve 38 is opened to permit liquid to fill the region surrounding the stand pipe and just beneath the diaphragm. This region must be filled with the lighter of the two liquids, and the technique just described accomplishes this. Then vent valve 38 is closed.

As more and more of the binary mixture is run into the tank, the denser water gathers in increasing quantity at the bottom of the tank, and the interface 20 rises. Until the interface reaches at least the bottom of the stand pipe there is no buoyant force on the diaphragm, since the lighter fluid is in contact with all sides and all parts of the diaphragm and the standpipe. The diaphragm assembly then assumes its lowermost position by virtue of its own weight.

When the interface rises to a level above the bottom of the standpipe in the lowermost position of the diaphragm assembly, the lighter fluid in the region around the standpipe is trapped, and the water rises in the standpipe, lifting the unconfined gasoline in the standpipe. It will be appreciated that the lighter trapped gasoline acts as a float, and is buoyed up by the water in and below the standpipe. The interface in the separator tank and in the standpipe are at the same level. The diaphragm assembly, including the standpipe, is lifted by the rising water. As the water level rises, the arm 41 is pivoted, and this controls the position conditions of the valve members in control valve 42.

The baffle 32a serves to decrease the size of the diaphragm control case. It will be appreciated that the vertical distance from the diaphragm to the lower margin of the baffle is the height of the gasoline "float" trapped under the diaphragm. To demonstrate this, consider that the lower chamber 37 is first filled with the lighter liquid. Then a heavier liquid such as water is introduced through lower pipe 28. The water must flow under the lower margin of the baffle to enter the lower chamber. However, the gasoline above that lower margin is trapped and cannot escape by flowing back through lower pipe 28. This permits a more effective "float" of lighter liquid to be created in a diaphragm valve cavity of a given height.

Hitherto known diaphragm controls without a standpipe have had a tendency to "flood-out" when a sudden surge of water entered the separator tank which was great enough to flood the upper chamber 36 with water. It will be appreciated that if diaphragm 32 were imperforate, filling both chambers with water, as could occur if the interface suddenly rose above the level of upper conduit 18, would result in the diaphragm's assuming its lowermost position, as though both sides were contacted by gasoline or any other single liquid. Any valves controlled by the diaphragm position would then assume a position corresponding to that for no water in the separator tank. This would permit the binary mixture, or even straight water, to flow through the discharge line 24 from the separator tank. Thus the conventional diaphragm control can at times be flooded out by surges of the heavier liquid.

Such flooding cannot occur in the diaphragm control of this invention, because surges of water which might enter upper chamber 36 will simply flow down through the standpipe into the lower chamber 37. Even if the interface rises entirely above the diaphragm control, this control will not be flooded out, since the trapped gasoline or other light fluid will be retained under the diaphragm to exert its upward buoyant force and lift the diaphragm. There is no way for the heavier liquid to displace the buoyant body of lighter liquid.

The valve control 42, by means of which the diaphragm position is translated into drain valve and discharge valve operation, will now be described. Fig. 3 shows a normal condition of operation in which a small amount of water has connected in the separator tank, but in which the interface has not risen to the bottom of the standpipe 35. When there is so little water present, the drain valve need not be opened, as the water does no harm in small quantities at the bottom of the tank. The gasoline at the top of the discharge line will be substantially free of water, and the discharge valve will be open to permit the gasoline to flow.

The end of arm 41 held by pins 40a is at its lowest position, and the valve stem 62 is at its lowest position, so that poppet valve 77 is seated on annular seat 57, and the valve seat 66 on the end of the valve stem 62 is free of the poppet valve 77 so as to allow flow through axial passage 64.

Valve stem 67 is at its uppermost position, and lifts poppet valve 78 off of seat 60, and its valve seat 70 is sealed off by this poppet valve 78 so that there is no fluid pressure exerted in axial passage 68 from chamber 76.

Fluid pressure from the upper chamber 36 of the diaphragm control is always exerted in chamber 76 by virtue of fluid inter-communication through bore 55. With the condition of the valve stems as just described, this pressure flows past the open valve seat 60, through the valve seat insert 59, out ports 61, and into bore 54.

Figure 5:
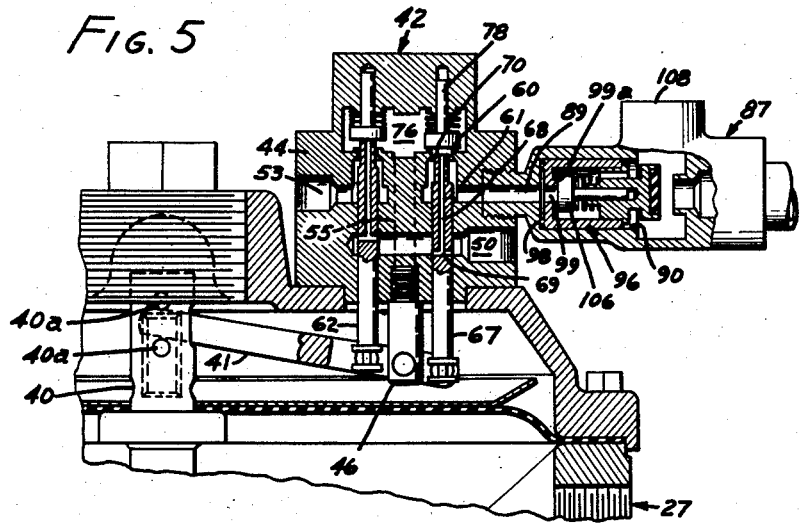
Figure 7:
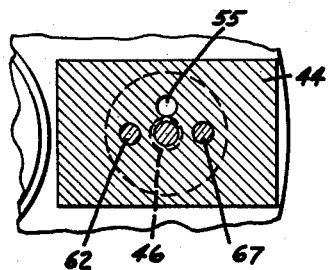
Fig. 7 is a fragmentary cross-section taken at line 7—7 of Fig. 4.

Before this pressure is exerted in bore 54, the accelerator valve 87 would be in the position shown in Fig. 5, with port 99 closed by the spring-loaded poppet valve 106, and the cylinder 90 completely closed off by sealing ring 98 bearing against the left end of the cylinder and by the close fit between the sides of the compound piston 96 and the cylinder 90.

When pressure is exerted in bore 54 the pressure moves the compound piston to the right as shown in Fig. 3, but during this travel, port 99 remains closed. Movement of the compound piston is stopped when cap 101 seats on valve seat 94 to close bore 93. The pressure thereafter bears on poppet valve 106 to open port 99 permitting fluid pressure to be exerted in conduit 108, and thereby on the discharge valve 24. Pressure on the discharge valve 24 causes the valve to open to permit flow through the outlet line 22. It will be recognized that flow through the passages just described will be slower than flow through the large unimpeded port 93. Therefore valve opening is slower than valve closing, because in the opening process, pressure application through the accelerator valve and conduit 108 is slower than pressure loss from conduit 108 directly out port 103 when the valve is to be closed.

Now with reference to valve stem 62, fluid pressure in chamber 76 is shut out from the valve seat insert 56 by poppet valve 77. However, there is a continuous fluid interconnection formed by this valve stem between bores 50 and 53. The fluid path from bore 53, through ports 58, axial passage 64, and transverse passage 65 into bore 50 is uninterrupted at this stem position. Bore 50 is connected to atmosphere, and in this position the drain valve 25 is connected to atmospheric pressure, and is closed.

Therefore, in the system conditions of Fig. 3, the drain valve is closed and the discharge valve is open, which reflects a normal condition when there is too little water, or even no water, to merit draining. The main flow of gasoline through outlet line 22 is unimpeded, the valve 24 being wide open.

The condition shown in Fig. 4 pertains when the gasoline-water interface has risen to a level at which it is desirable to drain off at least some of the water. At this time, the interface will have risen in the stand pipe, and raised the diaphragm structure so that the arm 41 is about horizontal.

At this arm position, although the valve stem 67 has moved down somewhat, the axial passage 68 is still closed off by the poppet valve 78, and the stem continues to hold the poppet valve up off the valve seat 60. Therefore the accelerator valve 87 will be in the same condition and with the same results as shown in Fig. 3. Bore 93 will be closed, and conduit 108 will have fluid pressure therein so as to maintain the discharge valve 24 in an open condition to permit gasoline to flow through outlet line 22.

However, the conditions regulated by valve stem 62 are changed from those of Fig. 3. Valve stem 62 has moved upward, and the valve seat 66 on its end is closed by poppet valve 77. Poppet valve 77 is also lifted off valve seat 57 of valve seat insert 56, so that fluid pressure from chamber 76 passes through this insert and out ports 58 into bore 53. Bore 53 interconnects with the drain valve 25, and the pressure in that bore communicated through conduit 111 opens the drain valve 25 to drain off the water. It will be observed that in this condition, no valve outlet is connected to atmosphere, since the axial passages of both valve stems are closed by the poppet valves, and both valves are open.

Therefore Fig. 4 illustrates another normal operating condition. In this condition, both the discharge valve and the drain valve are open, permitting simultaneous removal of the components of the binary mixture.

Fig. 5 illustrates an abnormal condition which may occur when a sudden surge of water enters the separator tank. Such surges may be beyond the capacity of the separator tank to separate, or of the drain valve to exhaust, while still providing full rate of flow of water-free gasoline. Such conditions might, for example, occur when separating gas and water pumped from a storage tank which may have received considerable water drainage during a rainstorm.

The valve stem 62 has been lifted up farther by arm 41 and the drain valve conditions controlled by stem 62 caused by this movement are the same as described in connection with Fig. 4. That is, fluid pressure from chamber 76 is exerted in bore 53, and thereby, through conduit 111, on the drain valve 25, so as to open the drain valve.

However, the valve stem 67 has been moved down so that poppet valve 78 is seated on valve seat 60 to close off the inside of valve seat insert 59 from pressure in chamber 76. The valve seat 70 on the end of the valve stem 67 has moved away from the poppet valve 78, so that axial passage 68 and transverse passage 69 are in fluid communication with the region inside the valve stem insert.

The open axial passage 69 permits atmospheric pressure in bore 50 to pass through ports 61 and into bore 89. This creates a differential pressure across the compound piston 96 with the lower pressure to the left of the compound piston as shown in Fig. 5 which first permits poppet valve 106 to seat on annular seat 99a. Then the higher pressure in conduit 108 which was previously exerted when the valve was open moves the compound piston to the left as shown in Fig. 5 to unseat cup 101 from the valve seat 94.

The conduit 108 is then directly connected to atmosphere through conduit 109, and the discharge valve 24 is closed because it is vented to atmosphere. The position of the compound piston 96 in the accelerator valve 87 is immaterial in this condition so long as bore 93 is left open although it usually will have travelled all the way to the left. Both sides of the compound piston are vented to atmosphere in Fig. 5.

In this condition, the flow through the outlet line 22 is stopped by the discharge valve 24, and the drain valve 25 is left open. This means that gasoline loaded with water cannot flow out of the outlet line. Flow of gasoline will be stopped until the condition of Fig. 4 again occurs.

Thus this control system assures that gasoline flows only when the fluid interface in the separator tank is at a low enough level that the gasoline will not be contaminated and the diaphragm valve assures a control for the control valve 47 which will not be flooded out by surges of excess water.

The operation of the system utilizing the horizontal separator tank is the same as for the system of Fig. 1, with the exception that the interface is preferably held to a level in the lower sump.

The accelerator valve 87 provides a faster valve action for closing than for opening. However, the accelerator valve, while contributing to a preferable valving system, can be eliminated, if desired, since the same valve control, although with a slower closing rate, will result if conduit 108 is connected directly to bore 54, since bore 54 is also vented to atmosphere in the condition of Fig. 5. The compound valve arrangement is quick acting in opening and closing passage 89 and bore 93, and gives a more precise separation.

Ball-type floats have previously been suggested for controlling valving means in response to the level of the interface between two liquids being separated. However, the specific gravity of these floats must be very carefully adjusted, and any departure from strict limits will result in a failure of the float to conform to the interface position. Furthermore, when liquids having fairly close specific gravities are being separated, such as a fuel with specific gravity of 0.9 and water with specific gravity of 1.0, ball type float means are not sufficiently dependable for installations where certainty of separation is needed.

It will be appreciated that the buoyancy given the diaphragm in this diaphragm control results entirely from the trapped less dense fluid under the diaphragm, since there is a hole right through the middle of the diaphragm itself. This fluid will always be the lighter of the components and it invariably provides buoyancy as the interface rises. The cross-section of this float region may be made as large as desired to create as great a lifting force as needed for an installation. These features are completely independent of the magnitude of difference in the specific gravities of the components, and therefore this diaphragm control is uniformly useful in binary separations even when the specific gravities are close to each other in value. Furthermore, without adjustment, this diaphragm control is useful for any binary system without the necessity of providing float ballast and the like to adjust the buoyance of control system elements.

It will be appreciated that the gasoline-water separation has been selected as a convenient example of a frequent application for this control system. Any other two liquids may be separated, utilizing this device, so long as there is a difference in their specific gravities, and so long as they do not form a permanent and complete emulsion which would not permit the heavier liquid to settle and form an interface. It will also be evident that other desired devices may be controlled besides valves, by the movement of the diaphragm caused by a rising or falling interface.

Therefore this invention is not to be limited to the embodiments shown in the drawings and described in the description, which are given by way of example and not limitation, but only in accordance with the scope of the appended claims.

I claim:

1. A diaphragm control comprising a casing having a cavity therein, a movable flexible diaphragm extending substantially horizontally across said cavity and making a continuous fluid-tight seal with the casing so as to divide the cavity into an upper chamber and a lower chamber, an open stand pipe affixed to and passing through said diaphragm and projecting a substantial distance downwardly into said lower chamber and create a region around said stand pipe beneath said diaphragm in which a lighter fluid can be trapped by the rising of a heavier liquid beneath it, fluid flow directly between said two chambers being possible only through said standpipe at any position of the diaphragm, whereby said entrapped lighter liquid acts as a float to raise the diaphragm as the heavier liquid rises in the standpipe, a first port through said casing communicating with the lower chamber, and a second port through said casing communicating with the upper chamber.

2. A diaphragm control for controlling flow of liquid from a separator tank in which tank two liquids of different specific gravities are permitted to separate so that the heavier liquid sinks to a lower level and the lighter liquid rises above the heavier liquid, thereby forming an interface between the heavier and the lighter liquids, said separator tank having an inlet, an outlet for the lighter liquid, and an outlet for the heavier liquid, control valves in each of said outlets, each control valve being capable of shutting off or permitting flow through the outlet in which it is disposed, actuator means for determining the control positon of said control valves, said actuator means being actuated by the diaphragm control, the separator tank having two conduits therethrough, said conduits interconnecting with the inside of said separator tank at different vertical levels, said diaphragm control comprising a casing with a cavity therein, a movable flexible diaphragm extending substantially horizontally across said cavity to divide the cavity into an upper chamber and a lower chamber, the upper of the conduits being connected to the upper chamber, and the lower of the conduits being connected to the lower chamber, an open stand pipe passing through said diaphragm so as to extend below said diapragm to create a region around said standpipe and beneath said diaphragm in which some of the lighter liquid can be trapped by the rising of the heavier liquid, whereby said trapped liquid acts as a float to raise the diaphragm as the interface rises in the stand pipe, whereby the control valve conditions can be altered through said actuator means by movement of the diaphragm so as to control flow through the outlets.

3. A diaphragm control according to claim 2 in which the stand pipe is affixed to the diaphragm at a central position of said diaphragm and in which said stand pipe extends substantially vertically downward therefrom to interconnect the upper and lower chambers.

4. A diaphragm control according to claim 3 in which a vent valve is provided through the valve case immediately below the diaphragm for venting the lower chamber to assure its being filled with the lighter liquid.

5. A valve control system including a diaphragm control for controlling flow of liquids from a separator tank with a settling chamber in which two liquids of different specific gravities are permitted to separate so that the heavier liquid settles to a lower level and the lighter liquid rises above the heavier liquid, thereby forming an interface between the heavier and the lighter liquids, said separator tank having an inlet, an outlet for the lighter liquid, and an outlet for the heavier liquid, flow valves in each of said outlets, each valve being capable of shutting off or permitting flow through the outlet in which it is disposed, the control position of said flow valves being determinable by the condition of the diaphragm control, the separator tank having two conduits therethrough, said conduits interconnecting with the settling chamber of said separator tank at different vertical levels, said valve control system comprising: a diaphragm control comprising a casing with a central cavity therein, a flexible diaphragm extending substantially horizontally across said cavity to divide the cavity into an upper chamber and a lower chamber, the upper of the conduits from the separator tank being connected to the upper chamber, and the lower of said conduits being connected to the lower chamber, an open stand pipe affixed to and passing through said diaphragm so as to extend below said diaphragm into said lower chamber and create a region around said stand pipe and beneath said diaphragm in which the lighter liquid can be trapped by the rising of the heavier liquid, whereby said lighter liquid acts as a float to raise the diaphragm as the interface rises in the stand pipe; and a control valve comprising a case, an arm, a pivot for said arm whereby the arm may be pivoted relative to the case, one point of the arm being interconnected with the diaphragm of the diaphragm control so as to be raised and lowered thereby, and another point of said arm spaced from said first point being connected to the pivot of the control valve, a pair of valve stems mounted for reciprocal movement in said case and connected to said arm, said case having a cavity therein, said cavity being in fluid connection with a source of fluid under pressure, each of said valve stems having an axial bore and a transverse bore intersecting said axial bore for providing fluid interconnection between the cavity of the control valve and a medial point of the surface of the valve stem, said control valve case having a bore interconnecting with said transverse bore of both of the valve stems, a pair of poppet valves, one of said poppet valves being disposed axially in line with each of said valve stems, said poppet valves being disposed in the cavity of the control valve case, whereby each poppet valve is so disposed and arranged as to close off the axial bore of the valve stem which it is aligned with when said valve stem is moved against its aligned poppet valve, the case having fluid conduit means opening into the cavity each adapted to be closed by one of said poppet valves when the poppet valve is not engaged by a valve stem, each of said fluid conduit means connecting with one of said flow valves; and an accelerator valve having a cylinder therein connected with one of said last named bores, a compound piston in said cylinder, said compound piston comprising a cup shaped piston member having an axial port therein, a plug affixed to an open end of the cup-shaped member, a poppet valve in said plug adapted to be seated to close said axial port, and a valve seat on the body surrounding an axially disposed port in the body adapted to be closed by an end of the compound piston, said body further having a port adapted to be interconnected to one of said flow valves, whereby the valve stems are adapted to be moved by movement of the arm to vary the exertion of fluid pressure to the flow valves so as to actuate those valves.

6. Apparatus according to claim 5 in which the valve stems are connected to the arm on opposite sides of said pivot.

7. A valve control system including diaphragm control for controlling flow of liquids from a separator tank with a settling chamber in which two liquids of different specific gravities are permitted to separate so that the heavier liquid settles to a lower level and the lighter liquid rises above the heavier liquid, thereby forming an interface between the heavier and the lighter liquids, said separator tank having an inlet, an outlet for the lighter liquid, and an outlet for the heavier liquid, flow valves in each of said outlets, each valve being capable of shutting off or permitting flow through the outlet in which it is disposed, the control position of said flow valves being determinable by the condition of the diaphragm control, the separator tank having two conduits therethrough, said conduits interconnecting with the settling chamber of said separator tank at different vertical levels, said valve control system comprising: a diaphragm control comprising a casing with a central cavity therein, a flexible diaphragm extending substantially horizontally across said cavity to divide the cavity into an upper chamber and a lower chamber, the upper of the conduits from the separator tank being connected to the upper chamber, and the lower of said conduits being connected to the lower chamber, an open stand pipe affixed to and passing through said diaphragm so as to extend below said diaphragm into said lower chamber and create a region around said stand pipe and beneath said diaphragm in which the lighter liquid can be trapped by the rising of the heavier liquid, whereby said lighter liquid acts as a float to raise the diaphragm as the interface rises in the stand pipe; and a control valve comprising a case, an arm, a pivot for said arm whereby the arm may be pivoted relative to the case, one point of the arm being interconnected with the diaphragm of the diaphragm control so as to be raised and lowered thereby, and another point of said arm spaced from said first point being connected to the pivot of the control valve, a pair of valve stems mounted for reciprocal movement in said case and connected to said arm, said case having a cavity therein, said cavity being in fluid connection with a source of fluid under pressure, each of said valve stems having an axial bore and a transverse bore intersecting said axial bore for providing fluid interconnection between the cavity of the control valve and a medial point of the surface of the valve stem, said control valve case having a bore interconnecting with said transverse bore of both of the valve stems, a pair of poppet valves, one of said poppet valves being disposed axially in line with each of said valve stems, said poppet valves being disposed in the cavity of the control valve case, whereby each poppet valve is so disposed and arranged as to close off the axial bore of the valve stem which it is aligned with when said valve stem is moved against its aligned poppet valve, the case having fluid conduit means opening into the cavity each adapted to be closed by one of said poppet valves when the poppet valve is not displaced by a valve stem, each of said fluid conduit means connecting with one of said flow valves; whereby said valve stems are adapted to be moved by movement of the arm to vary the exertion of fluid pressure to the flow valves to actuate said flow valves.

8. Apparatus according to claim 7 in which the valve stems are connected to the arm on opposite sides of said pivot.

9. A control valve for controlling a pair of flow valves, comprising: a case, an arm, a pivot for said arm whereby the arm may be pivoted with relation to said case to establish a controlling condition for said control valve, one point of said arm being connected to the pivot of the control valve, a pair of valve stems mounted for reciprocal movement in said case and connected to said arm, said case having a cavity, means for connecting said cavity with a pressure source, each of said valve stems having an axial bore and a transverse bore intersecting said axial bore for providing fluid interconnection between the cavity of the control valve and a medial point of the surface of the valve stems, said control valve case having a bore interconnecting said transverse bore of both of the valve stems, a pair of poppet valves, one of said poppet valves being disposed axially in line with each of said valve stems, said poppet valves being disposed in the cavity of the control valve case, whereby each poppet valve is so disposed and arranged as to close off the axial bore of the valve stem it is aligned with when said valve stem is moved against its aligned poppet valve, the case having fluid conduit means opening into the cavity, each adapted to be closed by one of said poppet valves when the poppet valve is not displaced by a valve stem, each of said conduits connecting with one of said flow valves, whereby the valve stems are adapted to be moved by movement of the arm to vary the exertion of fluid pressure to the flow valves so as to actuate those valves.

10. Apparatus according to claim 9, in which the said valve stems are mounted to said arm on opposite side of said pivot.

11. A diaphragm control according to claim 1 in combination with a separator tank, a first conduit attached to said first port and connecting said lower chamber to a lower region in said separator tank, and a second conduit attached to said second port and connecting said second chamber to an upper region in said separator tank, whereby the position of said diaphragm is responsive to the position of an interface between liquids of different specific gravity in said separator tank.

12. A diaphragm control according to claim 1 in which the stand pipe is affixed to the diaphragm at a central position of said diaphragm.

13. A diaphragm control according to claim 1 in which the stand pipe is affixed to the diaphragm at a central position of said diaphragm, and in which a vent valve is provided through the valve case immediately below the diaphragm for venting the lower chamber to assure its being filled with the lighter of two liquids being separated which liquids have different specific gravities.

14. Apparatus according to claim 5 in which the cavity in the control valve case is connected to the cavity in the diaphragm control as a source of fluid under pressure.

15. Apparatus according to claim 7 in which the cavity in the control valve case is connected to the cavity in the diaphragm control as a source of fluid under pressure.

References Cited in the file of this patent

UNITED STATES PATENTS

| | | |
|---|---|---|
| 795,448 | McGonacle | July 25, 1905 |
| 862,867 | Eggleston | Aug. 6, 1907 |
| 1,315,662 | Gouchenour | Sept. 9, 1919 |
| 1,726,102 | Forman | Aug. 27, 1929 |
| 2,270,549 | Orr | Jan. 20, 1942 |
| 2,664,170 | Walker et al. | Dec. 29, 1953 |